Aug. 12, 1930.                H. HOLTE                1,772,998
                        PASTEURIZING APPARATUS
                    Filed Jan. 7, 1928        2 Sheets-Sheet 2
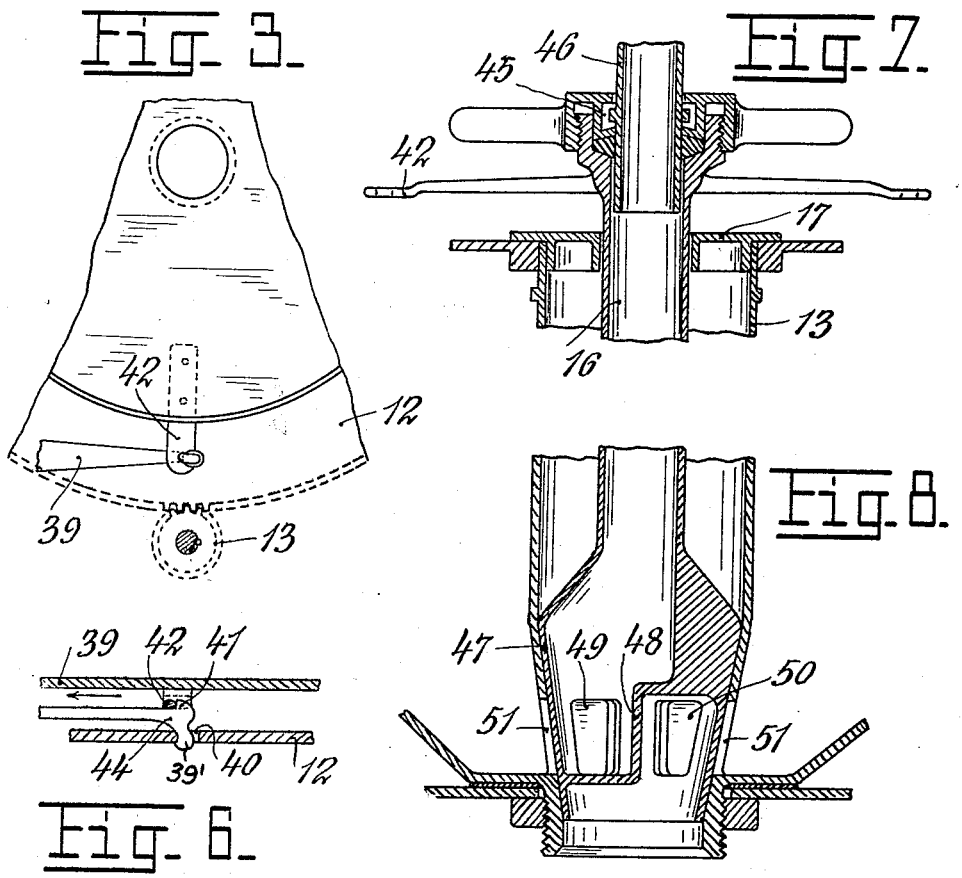
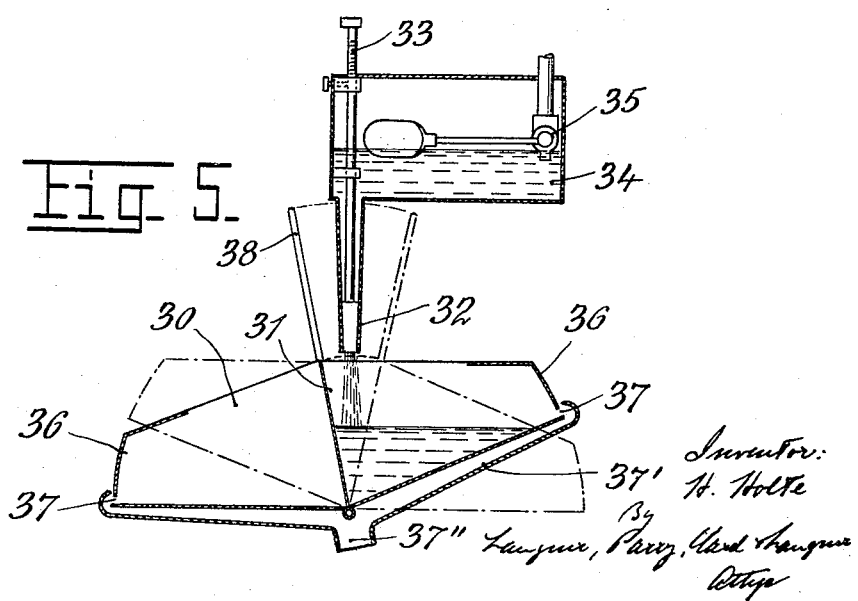

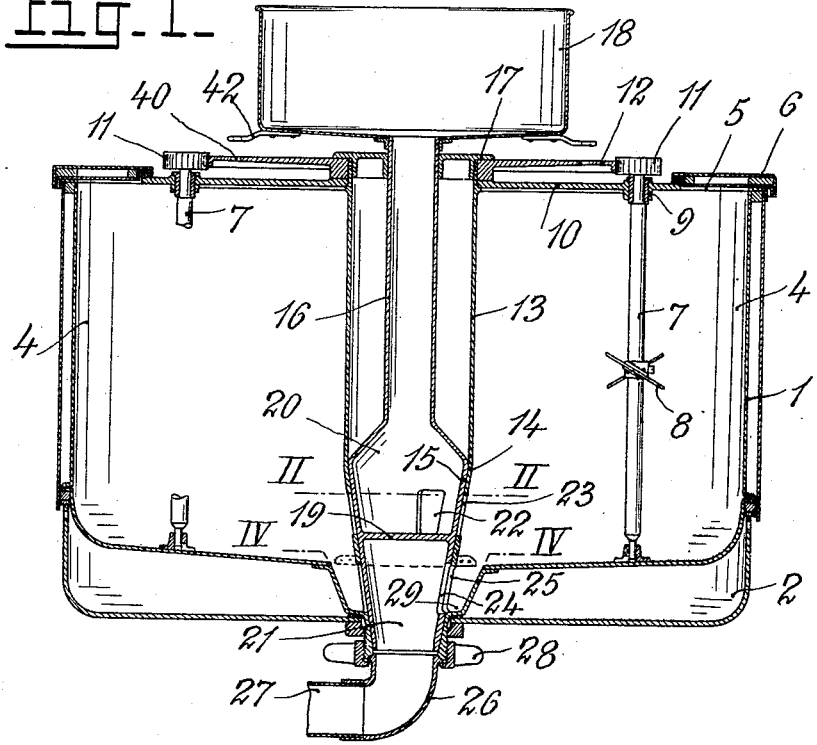
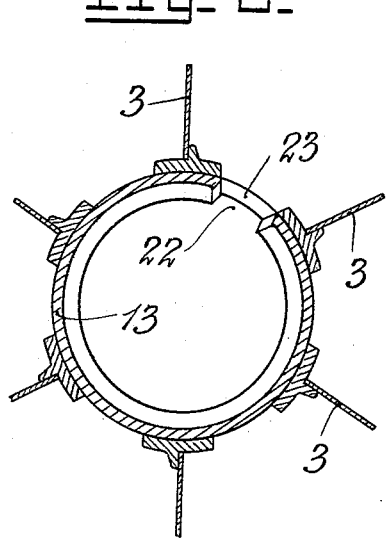
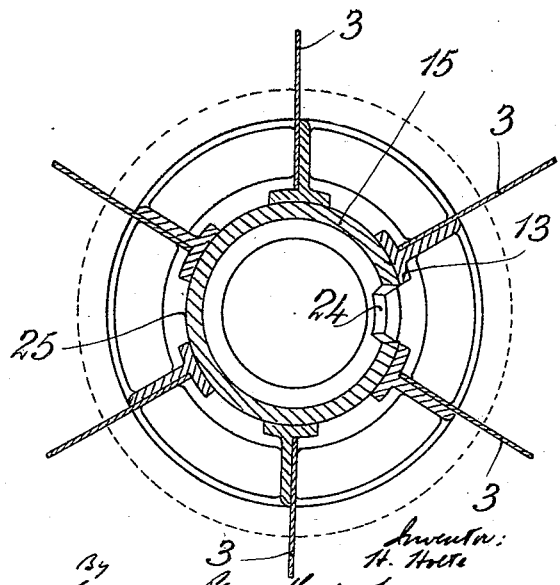

Patented Aug. 12, 1930

1,772,998

UNITED STATES PATENT OFFICE

HALVOR HOLTE, OF SKIEN, NORWAY

PASTEURIZING APPARATUS

Application filed January 7, 1928, Serial No. 245,237, and in Norway January 22, 1927.

My invention relates to multi-chambered pasteurizing apparatus for milk and other liquids of the kind, in which the distribution of the milk or other liquid to the individual chambers, and the letting out of it from these chambers is provided by aid of a central valve body, the interconnection between this valve body and the individual pasteurization chambers being arranged in such manner that there is periodically established direct communication between the valve chambers and the individual milk chambers.

The principal feature of my invention is to provide a pasteurization apparatus of this kind, in which there are arranged means for letting the completely pasteurized liquid from the said pasteurization chambers out through a chamber in the said valve body to a common discharge pipe arranged axially to said valve body and having airtight connection to the same, this discharge pipe being arranged so as to maintain airtight connection with the valve body during the step by step movements of the latter.

In the following the invention shall be described with reference to the accompanying drawings, in which:

Fig. 1 is a central vertical section of the apparatus.

Fig. 2 is a section on line II—II in Fig. 1.

Fig. 3 illustrates a detail of the actuating mechanism of the apparatus.

Fig. 4 is a section on line IV—IV in Fig. 1.

Fig. 5 is a diagrammatical vertical sectional view of a device for determining the length of the time intervals for the step by step motion and for effecting this motion.

Fig. 6 illustrates a detail in the transmission of this intermittent motion to the valve body.

Fig. 7 is a sectional view of the packing box connecting the apparatus to the milk supply tube.

Fig. 8 is a sectional view of a modified form of the distribution valve.

In the drawings 1 is the pasteurization receptacle, which is preferably of circular cross section. The liquid contained therein may suitably be kept at the desired temperature by aid of a bottom chamber 2, which is kept supplied with a heating liquid (water) in well known manner. The receptacle 1 is subdivided into a number of completely separated pasteurization chambers 4 by aid of vertical partitions 3. In the drawings are shown six such chambers (Figs. 2 and 4). These chambers are accessible from without through a ring shaped opening 5, which is normally closed by a ring shaped lid 6. In the drawings (Fig. 1) this lid as well as the vertical wall of the receptacle 1 is shown as hollow and filled with insulating material. In each of the chambers 4 is placed a shaft 7 provided with stirring arms 8 (Fig. 1). These shafts 7 are at their upper ends passed through journals 9 in the top 10 of the receptacle, and above these journals they carry gears 11 in mesh with a large, central, intermittently rotated gear 12. The provision of stirring arms 8 is necessary to prevent the separation of the cream in fresh milk. If skim milk only is to be handled in the apparatus, these stirring means may be dispensed with.

Coaxially in the receptacle 1 is arranged a valve housing 13, whose upper part is preferably cylindrical. Its lower portion 14 is conical, so as to form a close fitting valve seat for the hollow conical valve body 15. The hollow interior of this body is by aid of a tube 16 arranged coaxially within the valve housing 13 and passing through an opening in a central lid 17 and connected to the milk supply can 18, from which the milk to be pasteurized is fed to the apparatus. The hollow interior of the conical valve body is by aid of a partition 19 divided into two separate chambers 20 and 21, the upper chamber 20 serving as a filling or supply chamber for the pasteurizing chambers 4, and the lower chamber 21 serving as an outlet for the same. The valve chamber 20 is provided with an outlet opening 22 registering with corresponding openings or ports 23 in the valve seat 14, which forms at the same time the inner wall of the individual pasteurization chambers 4 (Figs. 1 and 2). The valve chamber 21 is provided with an opening or port 24 registering with corresponding openings or ports 25 in the valve seat 14 (Figs 1 and 4). These openings 25 communicate with the outlet depressions 29 in the base of the chambers 4. The lower end of the valve chamber 21 opens direct into the elbow fitting 26, into which is fitted the outlet tube 27 carrying the pasteurized milk away from the apparatus.

The elbow fitting 26 is suitably connected to the lower part of the valve armature of the apparatus by aid of a wing nut 28.

The apparatus above described works in the following manner:

The filling and emptying of the pasteurization chambers 4 is effected by intermittent turning in its seat of the valve body, milk from the can 18 passing through the valve tube 16 and the valve chamber 20, the opening 22 and successive ones of the openings 23 into a fresh one of the said pasteurization chambers 4 for each intermittent turn of the valve body, each turning movement of this valve body being in the present case where six chambers 4 are provided, one sixth, (i. e. 60°) of a complete rotation. The chamber 4 thus being filled has just before been emptied by its outlet opening 25 being brought into register with the outlet port 24 of the valve body. Provided that there is imparted an intermittent turning motion to the valve body every 6th minute, then at each such intermittent motion one of the chambers 4 will first be emptied through the opening or port 24 and be immediately thereafter filled through the opening or port 22. Thus it will be seen that no other valve but the valve 15 is needed, this valve providing for the emptying and filling of all of the pasteurization chambers in turn. As these chambers are all in direct communication with the valve chambers, the valve housing constituting also the inner walls of these chambers, the cleansing of the apparatus is thereby greatly facilitated, as the whole valve mechanism is easily lifted out of the apparatus.

The intermittent turning of the valve body 15 may be effected in any suitable manner, and the invention is not limited to the use of any special mechanism for this purpose. In the accompanying drawings Figs. 1, 3, 5 and 6 is by way of example illustrated one mechanism suitable for this purpose, and constructed for water power. There is arranged a rocking water receptacle 30 of known construction, which is divided into two separate chambers by a partition 31, said chambers being filled alternately by aid of a conical tube 32, whose cross sectional area is controlled by aid of an adjustable rod 33, by aid of which the time interval between the rockings of the receptacle 30 may be accurately adjusted. Water is fed to the tube 32 from a receptacle 34, whose level is controlled by aid of a float actuated valve 35, which is opened as soon as the water level sinks below a predetermined mark. In accordance with this invention the receptacle 30 is provided with side walls of such shape and angle, that when one of the chambers has been sufficiently filled to rock the receptacle 30, the impact of the water against the wall 36 will produce a shock which will hasten the rocking movement. The water flows out from the respective chambers of the rocking receptcale 30, the openings 37 communicating with tubes or channels 37' arranged below the bottom of the chamber 30 and emptying through a common opening 37'' into an outlet. To the rocking receptacle 30 is fastened a rod 38 rocking with the receptacle, the rocking motion being timed so as to work for example at 6 minute periods. This rocking motion of the rod 38 is by any suitable means transferred to a rod 39 (Figs. 3 and 6), provided with a thumb 39' arranged to come into engagement with an opening 40 in the gear 12 (Figs. 1 and 6). Opposite to the thumb 39' is another projection 41 on the rod 39, said projection being adapted to come into engagement with arms 42, arranged with equidistant intervals on the under side of the can 18. This mechanism works in the following manner:

Each rocking of the rod 38 imparts to the rod 39 a motion in the direction of the arrow in Fig. 6, whereby owing to a sloping portion 44 arranged adjacent to the thumb 39' it is raised so much in relation to the gear 12 that its projection 41 engages one of the arms 42, simultaneously retaining the engagement between the thumb 39' and said gear 12. Both this gear 12 and the can 18, and the valve 16, 20 fastened to this can will consequently be moved by the rod 39 a distance corresponding to one sixth of a full turn, provided that there are arranged six pasteurization chambers 4 in the receptacle 1. Simultaneously the gear 12 will put the gears 11 and the stirring shafts 7 fastened thereto in rotation. When on the succeeding rocking of the rod 38 the rod 39 is moved in the opposite direction of the arrow in Fig. 6, the thumb 39' owing to the sloping portion 44 will sink deeper into the opening 40 of the gear, turning this gear in the opposite direction, but drawing the projection 41 out of engagement with arm 42, whereby the can 18 and the valve body 15 are left in their respective positions until rod 39 is again rocked by the action of the rocking receptable 30.

As before mentioned this intermittent movement of the distributing valve may also be effected in other ways, as for instance by aid of a clockwork, or electromagnetic coupling connecting the mechanism intermittently with a rotating shaft, or the like; but the mechanism just described is considered particularly suitable for this purpose.

The open milk feeding can 18 may also be replaced by the arrangement illustrated in Fig. 7, in which the upper end of the valve tube 16 is connected direct to a milk feed tube 46 by aid of an airtight packing box 45, by which arrangement the milk may be fed continuously from the heating apparatus to the pasteurization apparatus without coming into contact with the outer air.

Fig. 8 illustrates a modified form of the valve body and the adjacent parts of the valve housing and the pasteurization chambers.

The conical valve body 47 is divided not by a horizontal partition as in Fig. 1, but by a vertical partition 48, whereby it is made possible to place the inlet port 49 and the outlet port 50 on the same level, and registering with the same openings or ports 51 in the parts of the valve housing serving simultaneously as inner walls of the pasteurization chambers 4, thus dispensing with separate inlet and outlet ports 23 and 24 for this purpose, and thereby further simplifying the arrangement and facilitating the cleansing of the same.

Claims:—

1. In pasteurization apparatus, a casing having therein a plurality of circumferentially arranged pasteurization chambers and a centrally located valve housing constituting an inner wall for each of said chambers and provided with openings, each in communication with a respective one of said chambers, a hollow valve body mounted for rotative movement in said housing and having separate chambers therein, the said valve body having an opening in its wall in communication with one of said chambers, an inlet conduit extending from said valve body and communicating with said chamber, the said opening being positioned to be brought successively into registration with the openings in the valve housing, in the rotative motion of the valve body, whereby the liquid to be pasteurized will be delivered to said pasteurization chambers in succession, the valve housing having a discharge pipe leading therefrom and in communication with the other chamber of the valve body, the said valve housing having other openings in its wall, each in communication with a respective one of the pasteurization chambers, the said valve body having an opening in its wall communicating with the said other chamber of said body and circumferentially offset with respect to the opening which is in communication with the first mentioned chamber of said valve body, whereby, in the rotative movement of the valve body, the last mentioned opening therein will be brought into registration with one of the last mentioned openings in the housing other than the one first specifically mentioned, and means for imparting step-by-step motion to the valve body.

2. In pasteurization apparatus, a casing having therein a plurality of circumferentially arranged pasteurization chambers and a centrally located valve housing constituting an inner wall for each of said chambers and provided with openings, each in communication with a respective one of said chambers, a hollow valve body mounted for rotative movement in said housing and having separate chambers therein, the said valve body having an opening in its wall in communication with one of said chambers, an inlet conduit extending from said valve body and communicating with said chamber, the said opening being positioned to be brought successively into registration with the openings in the valve housing, in the rotative motion of the valve body, whereby the liquid to be pasteurized will be delivered to said pasteurization chambers in succession, the valve housing having a discharge pipe leading therefrom and in communication with the other chamber of the valve body, the said valve housing having other openings in its wall, each in communication with a respective one of the pasteurization chambers, the said valve body having an opening in its wall communicating with the said other chamber of said body and circumferentially offset with respect to the opening which is in communication with the first mentioned chamber of said valve body, whereby, in the rotative movement of the valve body, the last mentioned opening therein will be brought into registration with one of the last mentioned openings in the housing other than the one first specifically mentioned, and means for imparting step-by-step motion to the valve body, the said means comprising a rotary member, fixed with respect to the inlet conduit of the valve body, and means for automatically imparting intermittent rotative movement to said rotary member.

In testimony whereof I have signed my name unto this specification.

HALVOR HOLTE.